United States Patent [19]

Bissot et al.

[11] Patent Number: 4,539,084

[45] Date of Patent: Sep. 3, 1985

[54] UNREINFORCED MEMBRANE, ELECTROCHEMICAL CELL AND ELECTROLYSIS PROCESS

[75] Inventors: Thomas C. Bissot, Newark; Stephen Li, Wilmington, both of Del.

[73] Assignee: E. I. Du Pont de Nemours and Company, Wilmington, Del.

[21] Appl. No.: 473,963

[22] Filed: Mar. 10, 1983

[51] Int. Cl.$^3$ .................. C25B 1/34; C25B 13/02; C25B 13/08
[52] U.S. Cl. ......................... 204/98; 204/128
[58] Field of Search ................ 204/98, 128, 296, 252, 204/263, 266

[56] References Cited

U.S. PATENT DOCUMENTS

| | | | |
|---|---|---|---|
| 3,940,916 | 3/1976 | Grot | 57/140 R |
| 4,021,327 | 5/1977 | Grot | 204/296 |
| 4,135,996 | 1/1979 | Buoy et al. | 204/98 |
| 4,272,337 | 6/1981 | Darlington | 204/98 |
| 4,323,434 | 4/1982 | Yoshida et al. | 204/98 |
| 4,349,422 | 9/1982 | Maloney | 204/98 |
| 4,356,068 | 10/1982 | Darlington | 204/98 |

FOREIGN PATENT DOCUMENTS

| | | |
|---|---|---|
| 45603 | 2/1982 | European Pat. Off. . |
| 56707 | 7/1982 | European Pat. Off. . |
| 0066127 | 12/1982 | European Pat. Off. ............ 204/296 |
| 55-110786 | 8/1980 | Japan . |
| 57-131378 | 8/1982 | Japan . |
| 57-131377 | 8/1982 | Japan . |
| 57-194268 | 11/1982 | Japan . |
| 57-194269 | 11/1982 | Japan . |

*Primary Examiner*—Howard S. Williams
*Assistant Examiner*—Terryence Chapman

[57] ABSTRACT

An unreinforced ion exchange membrane which comprises fluorinated polymer which has carboxylic functional groups, which has a hydrogen bubble release layer on the cathode-facing side thereof, and which has channels open to the outer surface of the anode-facing side thereof, is described. Precursor membrane, which may contain partially embedded sacrificial members, and from which the unreinforced ion exchange membrane is made, is also described. The unreinforced ion exchange membrane can be used to separate the compartments of a chloralkali cell, and such a cell operates at low voltage, high current efficiency, and low power consumption.

51 Claims, No Drawings

UNREINFORCED MEMBRANE, ELECTROCHEMICAL CELL AND ELECTROLYSIS PROCESS

BACKGROUND OF THE INVENTION

Fluorinated ion exchange polymers having carboxylic acid and/or sulfonic acid functional groups or salts thereof are known in the art. One principal use of such polymers is as a component of a membrane used to separate the anode and cathode compartments of a chloralkali electrolysis cell. Such membrane can be in the form of a reinforced or unreinforced film or laminar structure.

Use of reinforcement within a membrane, while making it stronger, is not totally beneficial. One deleterious effect is that use of reinforcement such as fabric results in a thicker membrane, which in turn leads to operation at higher voltage because the greater thickness results in a higher electrical resistance. Additionally, thick layers of polymer at the junctions of threads in a reinforcing fabric also constitute regions of high resistance. (By "junctions" is meant the crossover points where threads in the warp meet threads in the weft.) A second deleterious effect, which also leads to operation at higher voltage, is caused by a "shadowing" effect of the reinforcing members. The shortest path for an ion through a membrane is a straight perpendicular path from one surface to the other surface. Reinforcement members are uniformly fabricated of substance which is not ion-permeable. Those parts of a membrane where an ion cannot travel perpendicularly straight through the membrane, and from which the ion must take a circuitous path around a reinforcng member, are termed "shadowed areas". Introduction of shadowed areas into a membrane by use of reinforcement in effect leads to a reduction in the portion of the membrane which actively transports ions, and thus increases the operating voltage of the membrane.

It is thus desirable to provide, for use in a chloralkali cell, unreinforced membrane capable of operation at low voltage and high current efficiency, and thereby at low power consumption, so as to provide products of high purity at low cost, especially in view of today's high cost of energy.

In view of the current trend in the chloralkali industry toward use of zero gap and narrow gap cells, so as to minimize the contribution of electrolyte resistance to total cell voltage, it is also important to provide for use in such cells unreinforced membrane which is capable of operating at low voltage and high current efficiency.

It is a principal object of this invention to provide unreinforced ion exchange membrane which operates at low voltage and high current efficiency, and thereby at low power consumption.

It is a specific object of this invention to provide unreinforced membrane especially adapted for use in zero-gap and narrow-gap chloralkali cells. Other objects will be apparent hereinbelow.

SUMMARY OF THE INVENTION

Briefly, according to the present invention, there is provided unreinforced ion exchange membrane having a hydrogen bubble release layer on the cathode-facing surface thereof, and a surface topography at the anode-facing surface which is characterized by a specific range of "void content", as defined hereinafter. The invention resides in an unreinforced fluorinated cation exchange polymer membrane having a hydrogen bubble release layer at the cathode-facing surface thereof in combination with the critical void content open to the anode-facing surface thereof, which provides performance at low voltage and high current efficiency.

More specifically there is provided in an unreinforced fluorinated cation-exchange polymer membrane which is an unreinforced film impermeable to hydraulic flow of liquid, said membrane comprising at least first and second layers of fluorinated polymer whose functional groups are —CFZ—COOM groups or —CFQ—SO$_3$M groups, where M is H, Na, K or NH$_4$, Z is F, CF$_3$ or CF$_2$Cl, and Q is F, Cl, C$_1$ to C$_{10}$ perfluoroalkyl or CF$_2$Cl, adjacent said layers being in adherent contact with one another, said first layer being of polymer whose functional groups are —CFZ—COOM groups and said second layer being of polymer whose functional groups are —CFQ—SO$_3$M groups, the improvement wherein said membrane has a hydrogen bubble release layer at the outer surface of said first layer, has voids at the outer surface of said second layer characterized by a void content of 20 to 70%, and each said polymer with —CFZ—COOM groups has an equivalent weight of 670 to 1500 and each said polymer with —CFQ—SO$_3$M groups has an equivalent weight of 600 to 1500. It will be understood that although the invention herein is described and illustrated in reference to membrane having voids in the form of channels, the voids can also be of other configurations.

There are also provided according to the invention precursor membrane from which the cation exchange membrane is made, an electrochemical cell having said cation exchange membrane as a component part thereof, and an electrolysis process in which said cation exchange membrane is used.

DETAILED DESCRIPTION OF THE INVENTION

The unreinforced membrane of the present invention is typically prepared from fluorinated polymer which has —COOR or —SO$_2$X functional groups, where R is lower alkyl and X is F or Cl, and, in some cases, a web of temporary support material.

The polymers used in the instant invention are of types known in the art. These include fluorinated polymers with pendant side chains containing sulfonic acid or carboxylic acid groups or their derivatives.

The carboxylic polymers with which the present invention is concerned have a fluorinated hydrocarbon backbone chain to which are attached the functional groups or pendant side chains which in turn carry the functional groups. When the polymer is in melt-fabricable form, the pendant side chains can contain, for example,

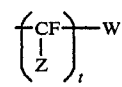

groups wherein Z is F, CF$_3$ or CF$_2$Cl, preferably F, t is 1 to 12, and W is —COOR or —CN, wherein R is lower alkyl. Preferably, the functional group in the side chains of the polymer will be present in terminal

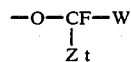

groups wherein t is 1 to 3.

By "fluorinated polymer" is meant a polymer in which, after loss of any R group by hydrolysis to ion exchange form, the number of F atoms is at least 90% of the total number of F, Cl and H atoms in the polymer. For chloralkali cells, perfluorinated polymers are preferred, though the R in any COOR group need not be fluorinated because it is lost during hydrolysis.

Polymers containing

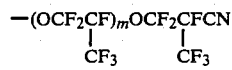

side chains, in which m is 0, 1, 2, 3 or 4, are disclosed in U.S. Pat. No. 3,852,326.

Polymers containing —$(CF_2)_n$COOR side chains, where n is 1 to 18, are disclosed in U.S. Pat. No. 3,506,635.

Polymers containing

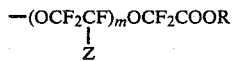

side chains, where Z and R have the meaning defined above and m is 0, 1, or 2 (preferably 1) are disclosed in U.S. Pat. No. 4,267,364.

Polymers containing terminal —$O(CF_2)_v$W groups, where W is as defined above and v is from 2 to 12, are preferred. They are disclosed in U.S. Pat. No. 3,641,104, U.S. Pat. No. 4,178,218, U.S. Pat. No. 4,116,888, British Pat. No. 2,053,902A, and British Pat. No. 1,518,387. These groups may be part of

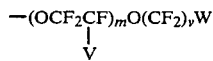

side chains, where V is F, $CF_3$ or $CF_2Cl$. Especially preferred are polymers containing such side chains where v is 2, which are described in U.S. Pat. No. 4,138,426 and S. Afr. No. 78/002225, and where v is 3, which are described in U.S. Pat. No. 4,065,366. Among these polymers, those with m=1 and V=$CF_3$ are most preferred. Polymers with side chains wherein V is $CF_2Cl$ are disclosed in European patent publication No. 41737.

The above references describe how to make these polymers.

The sulfonyl polymers with which the present invention is concerned are fluorinated polymers with side chains containing the group

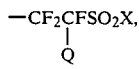

wherein Q is F, Cl, a $C_1$ to $C_{10}$ perfluoroalkyl radical, or $CF_2Cl$, and X is F or Cl, preferably F. Ordinarily, the side chains will contain —$OCF_2CF_2CF_2SO_2X$ or —$OCF_2CF_2SO_2F$ groups, preferably the latter. The term "fluorinated polymer" carries the same meaning as employed above in reference to carboxylate polymers.

For use in chloralkali membranes, perfluorinated copolymers are preferred.

Polymers containing the side chain

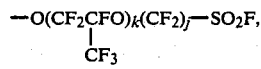

where k is 0 or 1 and j is 3, 4, or 5, may be used. These are described in British Pat. No. 2,053,902A.

Polymers containing the side chain —$CF_2CF_2SO_2X$ are described in U.S. Pat. No. 3,718,627.

Preferred polymers contain the side chain

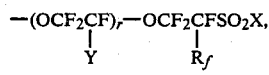

where X is as defined above, Y is F or $CF_3$, r is 1, 2, or 3, and $R_f$ is F, Cl, or a $C_1$ to $C_{10}$ perfluoroalkyl radical, most preferably F, and are described in U.S. Pat. No. 3,282,875. Especially preferred are copolymers containing the side chain

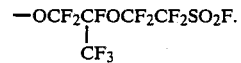

Polymerization can be carried out by the methods described in the above references. Especially useful is solution polymerization using $ClF_2CCFCl_2$ solvent and $(CF_3CF_2COO)_2$-initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The copolymers used in the layers described herein should be of high enough molecular weight to produce films which are self-supporting in both the melt-fabricable precursor form and in the hydrolyzed ion exchange form.

In addition to using separate films of the above-defined polymers, it is also possible to use a laminar film of two or more layers in making the membrane. For example, a film having a layer of a copolymer having sulfonyl groups in melt-fabricable form and a layer of a copolymer having carboxyl groups in melt-fabricable form, such as made by coextrusion, can be used in making the membrane of the invention.

When used as a component of a membrane to separate the anode and cathode compartments of an electrolysis cell, such as a chloralkali cell, the sulfonate polymers dealt with herein, after conversion to ionizable form, should have an equivalent weight in the range of 600 to 1500. Above 1500 the electrical resistivity becomes too high, and below 600 the mechanical and electrochemical properties are poor because of excessive swelling of the polymer. Preferably the equivalent weight is at least 900. Also, for most purposes, and for layers of such polymer of customary thickness, a value no greater than about 1400 is preferred.

For the carboxylate polymers dealt with herein, when used as a component of a membrane to separate the compartments of a chloralkali cell, the requirements thereof differ from those of the sulfonate polymers. The carboxylate polymer should have an equivalent weight in the range of 670 to 1500. A value below 1250 is preferred, so as to have lower resistance. Additionally, a value of at least 770 is preferred, so as to have good mechanical properties.

The multilayer membranes of the invention are prepared from component polymer films which have a thickness ranging from as low as about 13 microns (0.5 mil) up to about 150 microns (6 mils). As a multilayer membrane will generally be prepared from two or three such polymer films, the total thickness of polymer films used in making the resulting membrane will generally lie in the range of about 50 to 250 microns (2 to 10 mils), preferably 75 to 200 microns (3 to 8 mils), most preferably about 75 to 150 microns (3 to 6 mils).

The customary way to specify the structural composition of films or membranes in this field of art is to specify the polymer composition, equivalent weight and thickness of the polymer films in melt-fabricable form, from which the membrane is fabricated. This is done, in the case of both the immediate product membrane of the lamination procedure and the hydrolyzed ion-exchange membrane made therefrom, because, in the case of the hydrolyzed ion-exchange membrane, the measured thickness varies depending on whether the membrane is dry or swollen with water or an electrolyte, and even on the ionic species and ionic strength of the electrolyte, even though the amount of polymer remains constant. As the performance of a film or membrane is in part a function of the amount of polymer, the most convenient way to specify structural composition is as stated immediately above.

The unreinforced ion exchange membrane of the invention is made with the aid of temporary support elements, i.e., sacrificial elements partially embedded in the second surface, which are subsequently removed. Thus the term "unreinforced" as employed herein in reference to the membranes of the invention means that the membrane has no permanent reinforcement therein, but may have therein temporary support elements, i.e., sacrificial elements which are subsequently removed. Such elements are suitably elongate, i.e., in the form of strands, and most often are in the form of a web.

Such web of support material can suitably be a woven, knit, or non-woven fabric.

In the case of woven fabric, weaves such as plain weaves, ordinary basketweave and more complex weaves are suitable. The sacrificial threads can be either monofilament or multistranded.

The sacrificial members of a fabric can be yarn of any of a number of suitable substances, either natural or synthetic. Suitable substances include cotton, linen, silk, wool, rayon, polyamides such as 6—6 nylon, polyesters such as polyethylene terephthalate, and acrylics such as polyacrylonitrile. The cellulosic, polyester, polyamide and acrylic substances are preferred. The primary requirement of the sacrificial fibers is their removal without a detrimental effect on the remaining polymer matrix. With this proviso, the chemical makeup of the sacrificial fibers is not critical. In similar fashion the manner of removal of the sacrificial fibers is not critical as long as this removal does not interfere with the ion exchange capability of the final polymer in the cation permeable separator. For purposes of illustration, removal of sacrificial fibers of a cellulosic material such as rayon may be done with sodium hypochlorite. The sacrificial fibers are fibers which can be removed without a detrimental effect on either an intermediate polymer which is a precursor to a polymer possessing ion exchange sites or a polymer with ion exchange sites. The sacrificial fibers are removed from either type of such polymer leaving voids without interfering with the ion exchange capability of the final polymer.

The sacrificial members, e.g., rayon or polyester threads or narrow ribbon slit from regenerated cellulose film, can suitably be of about 40 to 100 denier. They can have an aspect ratio in the range of 1 to 20, i.e., can have a rectangular, oval or elliptical cross section, or if of low enough denier, can be of aspect ratio 1, i.e., circular in cross section. The sacrificial threads should have a thickness of 12 to 63 microns, preferably 25 to 38 microns.

The sacrificial members, e.g., sacrificial woven, knit or non-woven fabric of polymeric material, should be free of any foreign substance which interferes with attaining a reduction in voltage, e.g., a size or adhesive as found on "iron-on" fabrics.

The fabric of sacrificial members can be either woven or knit as described above, or non-woven. Non-woven fabrics of rayon, polyester or polyamide are available, and are suitable for use as a sacrificial fabric herein. Such non-woven fabrics contain individual filaments having a wide range of deniers; e.g., individual filaments in a typical suitable non-woven polyester fabric range in width from about 2.5 microns to 20 microns, but often occur in bundles which produce, in a membrane prepared therewith, channels of width ranging from about 2.5 microns to well in excess of 20 microns.

The sacrificial elements used in the present invention can also be elongate metal members, e.g., metal wires, suitably in the form of hardware cloth or screen.

Voids on the second surface of the membrane, in amount sufficient to provide a void content as specified herein, can, moreover, be suitably provided in either of the following additional ways: (1) impressing indentations in the second surface of the membrane by contacting that surface with an embossed roll, with heat and pressure; suitably, the roll may be embossed with a trihelical, pyramidal, quadrangular or other pattern, the number of cells or lines being 4–120/cm (10–300/inch) and the cell or line depth being 0.125–2.5 mm (5–100 mils); or (2) impressing indentations in the second surface of the membrane by contacting that surface with a textured surface such as a cloth or textured paper covered with particulate material of suitable particle size.

The membrane can be made from the component layers of film and the web of support material (i.e., the fabric of sacrificial yarns) with the aid of heat and pressure. Temperatures of about 200° C. to 300° C. are ordinarily required to fuse polymer films employed into adherent contact with each other, and to bring about an adequate degree of adherent contact of the component materials with each other, so as to form a unitary membrane structure with the support material, and, when more than two films are used, to make adjacent sheets of film fuse together; the temperature required may be even above or below this range, however, and will depend on the specific polymer or polymers used. The choice of a suitable temperature in any specific case will be clear, inasmuch as too low or too high a temperature will result in a membrane which, after removal of the sacrificial yarns, has a void content which is, respectively, less than or greater than that specified herein; additionally, at temperatures too high, embedment can become so deep that leaks through the membrane occur. Differential pressures of as little as about $2 \times 10^4$ pascals, to differential pressures exceeding $10^7$ pascals, e.g., as induced by a vacuum roll in a manner described below, can be used. One type of apparatus, which is suitable for batch operations, is a hydraulic press, which ordinarily will use a pressure in the range of $2 \times 10^5$ to $10^7$ pascals.

Apparatus suitable for continuous preparation of membrane, and which was employed in the examples unless otherwise specified, comprised a hollow roll with an internal heater and an internal vacuum source. The hollow roll contained a series of circumferential slots on its surface which allowed the internal vacuum source to draw component materials in the direction of the hollow roll. A curved stationary plate with a radiant heater faced the top surface of the hollow roll with a spacing of about 6 mm (¼ inch) between their two surfaces.

During a lamination run, porous release paper was used in contact with the hollow roll as a support material to prevent adherence of any component material to the roll surface and to allow vacuum to pull component materials in the direction of the hollow roll. Feed and takeoff means were provided for the component materials and product. In the feed means one idler roll of smaller diameter than the hollow roll was provided for release paper and component materials. The feed and takeoff means were positioned to allow component materials to pass around the hollow roll over a length of about 5/6 of its circumference. A further idler roll was provided for the release paper allowing its separation from the other materials. Takeoff means were provided for the release paper and the product membrane.

For use in ion exchange applications and in cells, for example a chloralkali cell for electrolysis of brine, the membrane should have all of the functional groups converted to ionizable functional groups. Ordinarily and preferably these will be sulfonic acid and carboxylic acid groups, most preferably in the form of alkali metal salts thereof. Such conversion is ordinarily and conveniently accomplished by hydrolysis with acid or base, such that the various functional groups described above in relation to the melt-fabricable polymers are converted respectively to the free acids or the alkali metal or ammonium salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethyl sulfoxide in the hydrolysis bath, to swell the membrane to increase the rate of hydrolysis.

The membranes described herein are modified on the outer surface of the first layer thereof (the surface facing the cathode of a chloralkali cell) so as to have enhanced gas release properties, for example by providing optimum surface roughness, or, preferably, by providing thereon a gas- and liquid-permeable porous non-electrode layer. Such layer may function to facilitate release of hydrogen bubbles, and is sometimes referred to as a hydrogen bubble release layer, and can be attached, detached or integral.

Such layer can be a non-electrode layer in the form of a thin hydrophilic coating and is ordinarily of an inert electroinactive or non-electrocatalytic substance. Such non-electrode layer should have a porosity of 10 to 99%, preferably 30 to 70%, and an average pore diameter of 0.01 to 1000 microns, preferably 0.1 to 100 microns, and a thickness generally in the range of 0.1 to 500 microns, preferably 1 to 25 microns. A non-electrode layer ordinarily comprises an inorganic component and a binder; the inorganic component can be of a type as set forth in published UK patent application GB No. 2,064,586A, preferably tin oxide, titanium oxide, zirconium oxide, nickel oxide, or an iron oxide such as $Fe_2O_3$ or $Fe_3O_4$. Other information regarding non-electrode layers on ion-exchange membranes is found in published European patent application No. 0,031,660, and in Japanese Laid-open patent applications No. 56-108888 and 56-112487.

Acceptable gas release properties on the outer surface of the first layer of the membrane, the surface facing the cathode of a chloralkali cell, can alternatively be provided by optimizing the roughness of that surface. For best hydrogen release properties, the roughness should be in the range of about 0.5 to 5 microns (20 to 200 microinches). Such a roughened surface can made by placing the precursor form of the membrane, i.e., that wherein the fluorinated polymer is still in a melt fabricable form, against a surface having the desired roughness, e.g, a release paper, an abrasive paper or a roughened metal roll, under heat and pressure. More information about suitable techniques can be found in U.S. Pat. Nos. 4,323,434 and 4,272,353.

A thin layer of asbestos paper placed in contact with the surface of the membrane which faces toward the cathode also functions as a hydrogen bubble release layer. The thickness of this layer can be 100–500 microns, preferably 200–300 microns.

An electrocatalyst on the outer surface of the first layer of the membrane can also function as a hydrogen bubble release layer to provide for good gas release properties. Such electrocatalyst can be of a type known in the art, such as those described in U.S. Pat. Nos. 4,224,121 and 3,134,697, and published UK patent application GB No. 2,009,788A. Preferred cathodic electrocatalysts include platinum black, Raney nickel and ruthenium black.

The binder component in a non-electrode layer, or in an electrocatalyst composition layer, can be, for example, polytetrafluoroethylene; a fluorocarbon polymer, at least the surface of which is hydrophilic by virtue of treatment with ionizing radiation in air or a modifying agent to introduce functional groups such as —COOH or —$SO_3H$ (as described in published UK patent application GB No. 2,060,703A), or treatment with an agent such as sodium in liquid ammonia; a functionally substituted fluorocarbon polymer or copolymer which has carboxylate or sulfonate functional groups; or polytetrafluoroethylene particles modified on their surfaces with fluorinated copolymer having acid type functional groups (GB Pat. No. 2,064,586A). Such binder is suitably used in an amount of 10 to 50% by wt. of the non-electrode layer or of the electrocatalyst composition layer.

A non-electrode layer can be applied to a membrane by various techniques known in the art, which include preparation of a decal which is then pressed onto the membrane surface, application of a slurry in a liquid composition (e.g., dispersion or solution) of the binder followed by drying, screen or gravure printing of compositions in paste form, hot pressing of powders distributed on the membrane surface, and other methods as set forth in GB Pat. No. 2,064,586A. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

Removal of the sacrificial fibers from the membrane can variously be done before, during or after conversion of the original membrane in melt-fabricable form to the ion exchange membrane. It can be done during said conversion when the sacrificial members are of a material which is destroyed by the hydrolysis bath employed for said conversion; an example is hydrolysis of a nylon polymer by caustic. It can be done before said conversion, e.g., in the case of rayon sacrificial members by treatment with aqueous sodium hypochlorite before said conversion, in which case there is prepared a membrane wherein the sacrificial fibers have been removed and the functional groups of the polymer layers are still in —COOR and —SO$_2$X form. Hydrolysis can also first be done, in which case, the functional groups are converted to —COOH and —SO$_3$H or salt thereof, and in which case there is prepared a membrane in ion exchange form which still contains the sacrificial fibers; the sacrificial fibers are subsequently removed, which, in the case of rayon or other cellulosic members, or polyester, polyamide or acrylic members, in a membrane used in a chloroalkali cell, can be done by action of hypochlorite ions formed during ordinary operation of the cell.

In the case of metallic sacrificial elements, following partial embedment in the second surface of the membrane, these sacrificial elements can be removed by physically stripping them from the membrane to leave channels, particularly when the circumferential wrap of the embedding polymer around the individual wires is not greatly more than 50%, or in many cases can be chemically removed.

Removal of sacrificial members from a membrane leaves channels in the membrane at the sites originally occupied by the sacrificial members. The form of the channels is an imprint of that portion of the sacrificial fibers which was embedded.

The channels should be provided to have a nominal width of 2.5 microns or greater, and preferably in the range of 10 to 100 microns. This nominal width is approximately the same as that of the sacrificial fiber, the removal of which results in formation of the channel. It is believed that the actual size of a channel can change, shrinking or collapsing when the membrane is dehydrated, and swelling when the membrane itself is swollen. The channels left by removal of sacrificial threads of a woven or knit fabric are desirably in the range of 10 to 100 microns in width, and by removal of a nonwoven sacrificial fabric are desirably 2.5 microns or greater in width.

The unreinforced membranes of the invention are prepared so that the web of support material partially embedded in the membrane does not penetrate through the first layer of fluorinated polymer which has carboxyl functionality. As a result, the channels lie at least predominantly in layers other than the first layer of polymer, and preferably completely in the second layer of polymer, which has sulfonyl functionality. The channels of the ion exchange membrane formed by removal of the sacrificial members do not penetrate through the membrane from one surface to the opposing surface, and the membrane is therefore impermeable to hydraulic flow of liquid at the low pressures typical of those occurring in a chloralkali cell. (A diaphragm, which is porous, permits hydraulic flow of liquid therethrough with no change in composition, while an ion exchange membrane permits selective permeation by ions and permeation of liquid by diffusion, such that the material which penetrates the membrane differs in composition from the liquid in contact with the membrane.) It is an easy matter to determine whether there are or are not channels which penetrate through the membrane by a leak test with gas or liquid.

A critical requirement of the subject invention is that the membrane is characterized by a specific range of "void content".

Although such membrane performs, for reasons which are not fully understood, at lower voltage and lower power consumption than similarly constituted membrane with void content below 20%, it is believed that unreinforced membrane of this invention may permit more facile exchange of anolyte liquor between the bulk anolyte and that in the voids than is possible in membrane having void content below 20%.

"Void content" is defined by the measurement method as described hereinbelow. It will be understood that void content relates to the open voids at the anode-facing surface of the membrane into which anolyte can flow, and is based on the entire volume of the membrane, including any attached or integral hydrogen bubble release layer, contained between the cathode-facing side of the membrane and a plane contacting the outermost projections of the anode-facing side of the membrane.

The channels or voids in the anode-facing side of a membrane having a void content in the desired range results from the removal of the sacrificial elements and is controlled by the proper selection of the support web and the temperature range and differential pressure during lamination.

A preferred unreinforced membrane of the invention is that which has a first layer of fluorinated polymer whose functional groups are -COOR functional groups as one surface layer, a second layer of fluorinated polymer whose functional groups are —SO$_2$F functional groups as the other surface layer, said first and second layers being in adherent contact with one another, and a temporary web of support material partially embedded in the second layer. Said first layer has a thickness in the range of about 13 to 75 microns (0.5–3 mils), and said second layer has a thickness in the range of about 75 to 150 microns (3–6 mils). After hydrolysis to the ion exchange form and removal of the sacrificial members of the support material, the resulting ion exchange membrane is a preferred membrane for a chloralkali cell. When there are additional layers of fluorinated polymer, these will be between said first and second layers, so that said first and second layers will always be the outermost said layers, and adjacent layers will be in adherent contact with one another.

It is also possible to make unreinforced membrane whose constitution with respect to the fluorinated ion-exchange polymer thereof (or precursor polymer thereof) is either (1) a single layer of polymer whose functional groups are —CFZ—COOM groups (or —CFZ—COOR groups), or (2) first and second layers of polymer, both being of polymer whose functional groups are —CFZ—COOM groups (or —CFZ—COOR groups), the two layers differing either in equivalent weight only or in chemical composition, with the higher equivalent weight layer or the composition with the lower water absorption forming the first (cathode-facing) layer of the membrane. In each case, such membrane is made such that the support material of sacrificial members is partially embedded in the outer surface of the second (anode-facing) layer of the membrane.

It is also possible to make unreinforced membrane whose constitution with respect to the fluorinated ion-exchange polymer thereof (or precursor polymer thereof) is either (1) a single layer of polymer whose functional groups are —CFQ—SO$_3$M groups (or —CFQ—SO$_2$X groups), or (2) first and second layers of polymer, both being of polymer whose functional groups are —CFQ—SO$_3$M groups (or —CFQ—SO$_2$X groups), the two layers differing either in equivalent weight only or in chemical composition, with the higher equivalent weight layer or the composition with the lower water absorption forming the first (cathode-facing) layer of the membrane. In each case, such membrane is made such that the support material of sacrificial members is partially embedded in the outer surface of the second (anode-facing) layer of the membrane.

It is also possible to make unreinforced membrane whose constitution with respect to the fluorinated ion-exchange polymer thereof (or precursor polymer thereof) is either (1) a single layer of polymer whose functional groups are —CFQ—SO$_3$M groups (or —CFQ—SO$_2$X groups) and whose cathode-facing surface has been chemically converted to carboxyl groups, or (2) first and second layers of polymer, both being of polymer whose functional groups are —CFQ—SO$_3$M groups (or —CFQ—SO$_2$X groups), the two layers differing either in equivalent weight only or in chemical composition, with the higher equivalent weight layer or the composition with the lower water absorption forming the first (cathode-facing) layer of the membrane and whose cathode-facing surface has been chemically converted to carboxyl groups. In each case, such membrane is made such that the support material of sacrificial members is partially embedded in the outer surface of the second (anode-facing) layer of the membrane.

A principal use of the ion exchange membrane of the invention is in electrochemical cells. Such a cell comprises an anode, a compartment for the anode, a cathode, a compartment for the cathode, and a membrane which is situated to separate the two said compartments. One example is a chloralkali cell, for which the membrane should have the functional groups in salt form; in such a cell, a layer of the membrane which has carboxylic functional groups will be disposed toward the cathode compartment.

The electrochemical cell, especially a chloralkali cell, will ordinarily be constructed such that the gap or spacing between the anode and cathode is narrow, i.e., no greater than about 3 mm. It is also often advantageous to operate the cell and electrolysis process with the membrane in contact with either the anode or cathode, which can be accomplished with the aid of an appropriate hydraulic head in one cell compartment, or by using an open mesh or grid separator to urge the membrane and selected electrode into contact. It is often further advantageous for the membrane to be in contact with both the anode and cathode in an arrangement referred to as a zero-gap configuration. Such arrangements offer advantages in minimizing the resistance contributed by the anolyte and catholyte, and thus provide for operation at lower voltage. Whether or not such arrangements are used, either or both electrodes can have an appropriate catalytically active surface layer of type known in the art for lowering the overvoltage at an electrode.

The membrane of the invention has voids open to the second surface of the membrane, i.e., the surface which will face the anode, characterized by a void content of 20 to 70%. "Void content" is significant because it is a measure of the voids into which anolyte flows. It is measured by a test method described in detail hereinbelow in reference to the Examples.

Open voids of the kind described herein result from removal of the sacrificial members either from a cation-exchange membrane which is a membrane of fluorinated polymer having —COOM and/or —SO$_3$M functional groups, where M is H, Na, K or NH$_4$, or from a precursor membrane which is a membrane of fluorinated polymer having —COOR and/or —SO$_2$X functional groups, where R is lower alkyl and X is F or Cl, having at the outer surface of the second layer thereof sacrificial members partially embedded therein.

To further illustrate the innovative aspects of the present invention, the following examples are provided.

EXAMPLES

In the examples, abbreviations are used as follows:
PTFE refers to polytetrafluoroethylene;
TFE/EVE refers to a copolymer of tetrafluoroethylene and methyl perfluoro(4,7-dioxa-5-methyl-8-nonenoate);
TFE/PSEPVE refers to a copolymer of tetrafluoroethylene and perfluoro(3,6-dioxa-4-methyl-7-octenesulfonyl fluoride);
EW refers to equivalent weight.

Substrate A was a laminar film having a layer of TFE/EVE 38 microns (1.5 mils) thick having an EW of 1050, and a layer of TFE/PSEPVE 102 microns (4 mils) thick having an EW of 1085, said film having been made by coextrusion as described in application U.S. Pat. Ser. No. 436,422 filed Oct. 25, 1982.

Fabric A was cotton cheesecloth, woven of 150 denier yarns, approximately 10 yarns/cm (25 yarns/inch) in both warp and weft, having a basis weight of 0.034 Kg/m$^2$ (1 oz/yd$^2$).

Fabric B was spunbonded polyethylene terephthalate, 0.8 mm (30 mils) thick, having a porosity of 0.76–1.02 m/s (150–200 cfm/ft$^2$) at a pressure of 125 pascals (0.5 inch of water) by the Frazier Air Permeability Test (ASTM D461, Section 18), and a basis weight of 0.20 kg/m$^2$ (5.8 oz/yd$^2$).

Fabric C was spunbonded polyethylene terephthalate, 0.13 mm (5 mils) thick, having a porosity of 6.6 m/s (1300 cfm/ft$^2$) at a pressure of 125 pascals, and a basis weight of 0.02 kg/m$^2$ (0.6 oz/yd$^2$).

Fabric D was was spunbonded polyethylene terephthalate, 0.25 mm (10 mils) thick, having a porosity of 4.06 m/s (800 cfm/ft.$^2$) at a pressure of 125 pascals, and a basis weight of 0.034 kg/m$^2$ (1.0 oz/yd$^2$).

Fabric E was a plain weave, polyethylene terephthalate fabric, the warp and fill being, respectively, 200×110 yarns/inch (79×43 yarns/cm), yarn size 50 denier×50 denier, yarn filament count 36×24, twist 6.5S×40S/40Z (turns per inch), having a basis weight of 0.072 kg/m$^2$ (2.13 oz/yd$^2$).

Fabric F was hardware cloth of Monel metal wires 41 microns (0.0016 inch) in diameter, 200×250 mesh.

Fabric G was an 84% cotton/16% polyethylene terephthalate corduroy fabric.

Fabric H was an 80% cotton/20% polyethylene terephthalate velour fabric.

Coating dispersion A consisted of the following:

| | |
|---|---|
| ethanol (absolute) | 84.2% by wt. |
| TFE/PSEPVE hydrolyzed to the acid (H+) form | 2.6% by wt. |
| ZrO2 (5-9 micron particles) | 13.2% by wt. |
| non-ionic surfactant | trace |

The non-ionic surfactant was

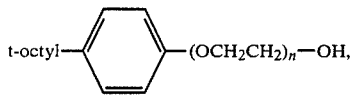

where n is 9-10 ("Triton" X-100 available from Rohm & Haas Chemical Co.).

Cell (type A) was a zero-gap chloralkali cell having a dimensionally stable anode, a platinized nickel screen cathode, and a nickel expanded metal mesh cathodic current collector, having an active membrane area of 45 cm$^2$, assembled such that the membrane contacted both anode and cathode.

All cell tests were made at 3.1 KA/m$^2$, 90° C., 32% caustic with 200 gpl NaCl in the anolyte unless otherwise specified.

The void content (VC) of a membrane was determined on membrane which had been hydrolyzed to the ion-exchange form, and in which the cathodic surface carried the hydrogen bubble release layer and in which the sacrificial elements had been removed. The determination is carried out by performing the following steps:

(a) measuring the thickness of a specimen of the membrane with a thickness gauge, measuring its area, calculating the apparent volume (Vol$_a$) of the specimen from these measurements, measuring the weight (Wt$_a$) of the specimen in air, and calculating its apparent density (d$_a$) from these measurements;

(b) measuring the weight (Wt$_b$) of the same specimen of membrane immersed in 1,1,2-trichloro-1,2,2-trifluoroethane (F-113), and calculating its true density (d$_t$) from these weights and the density (d$_f$) of F-113;

(c) dividing the apparent density by the true density, subtracting the resulting quotient from 1, and multiplying the resulting difference by 100 to express the void content as a percentage.

$$d_a = \frac{Wt_a}{Vol_a}$$

$$d_t = \frac{Wt_a \times d_f}{Wt_a - Wt_b}$$

$$VC(\%) = \left(1 - \frac{d_a}{d_t}\right) \times 100$$

EXAMPLE 1

The pattern from Fabric A was impressed on the sulfonyl fluoride side of Substrate A by laying Substrate A, sulfonyl fluoride side down, on Fabric A which in turn rested on a porous release paper and passing both through the heating section of a continuous line at 200° C., at 34 kPa (10 inch mercury) vacuum at 5.1 mm/s (1 ft/min). The resulting membrane was hydrolyzed, dried and coated on the cathode (carboxyl) side by spraying with coating dispersion A. The void content was 59%. Two samples were tested in type A cells described above. The average result at 32.0% NaOH was 95.8% current efficiency and 2.95 V after 14 and 28 days of operation.

EXAMPLE 2-1

The pattern of Fabric B was impressed on Substrate A using the method outlined in Example 1. The line conditions were 220° C., 34 kPa (10 inch mercury) vacuum, 5.1 mm/s. The resulting membrane was hydrolyzed and coated as in Example 1 and two samples were tested in type A cells. The void content on one sample was 53.3%. The average result for 32.1% NaOH was 95.4% current efficiency at 2.96 V after 13 and 83 days of operation.

EXAMPLE 2-2

Example 2-1 was repeated except that the line conditions were 215° C. and 71 kPa vacuum. The void content was 43.9%. One sample was tested and, at 31.2% NaOH, averaged 95.3% current efficiency at 3.03 V after 9 days of operation.

EXAMPLE 3-1

The steps of Example 1 were repeated using Fabric C. Line conditions were 225° C., 34 kPa vacuum, 5.1 mm/s. The void content was 24%. Two samples were tested and, at 31.7% NaOH, averaged 96.1% current efficiency at 2.93 V after 7 days of operation.

EXAMPLE 3-2

Example 3-1 was repeated, except that the line temperature was 215° C. The void content was 27.8%. One sample was tested and, at 31.2% NaOH, averaged greater than 96.3% current efficiency at 3.01 V after 9 days of operation.

EXAMPLE 4-1

The steps of Example 1 were repeated using Fabric D. Line conditions were 220° C. and 71 kPa (21 inch mercury) vacuum, 5.1 mm/s. The void content averaged 32%. Two samples were tested and at 31.6% NaOH averaged 96.4% current efficiency at 2.95 V after 9 and 10 days of operation.

EXAMPLE 4-2

Example 4-1 was repeated, except that the line conditions were 215° C. and 34 kPa vacuum. The void content was 34.5%. One sample was tested and, at 32.3% NaOH, averaged greater than 95.2% current efficiency at 3.04 V after 8 days of operation.

EXAMPLE 5-1

The steps of Example 1 were repeated using Fabric E. Line conditions were 215° C. and 71 kPa vacuum, 5.1 mm/s. The void content averaged 29%. One sample was tested and at 31.4% NaOH averaged 95.5% current efficiency at 2.87 V after 9 days of operation.

EXAMPLE 5-2

Example 5-1 was repeated, except that the line temperature was 220° C. The void content was 33.0%. One sample was tested and, at 32.2% NaOH, averaged 96.8% current efficiency at 2.99 V after 15 days of operation.

EXAMPLE 6

The steps of Example 1 were repeated using Fabric F, except that in this example, instead of a polymer fabric being destroyed and removed by chemical action of oxidizing chemical species in the electrolyte, the Monel metal wire fabric was physically stripped from the membrane before the membrane was placed in the test cell. Line conditions were 200° C. and 71 kPa vacuum, 5.1 mm/s. The void content was 20.6%. One sample was tested and at 32.5% NaOH gave 95.7% current efficiency at 2.98 V after 13 days of operation.

EXAMPLE 7-1

The steps of Example 1 were repeated using Fabric G. Line conditions were 200° C. and 34 kPa vacuum, 5.1 mm/s. The void content was 25.9%. One sample was tested and at 31.1% NaOH averaged 96.85% current efficiency at 2.98 V after 6 days of operation.

EXAMPLE 7-2

Example 7-1 was repeated, except that the line temperature was 220° C. The void content was 62.7%. One sample was tested and, at 31.1% NaOH, averaged 96.4% current efficiency at 3.03 V after 8 days of operation.

EXAMPLE 8-1

The steps of Example 1 were repeated using Fabric H, disposed such that the napped side of the fabric faced Substrate A. Line conditions were 200° C., 34 kPa vacuum, 5.1 mm/s. The void content was 28.6%. One sample was tested and, at 31.7% NaOH, averaged 97.1% current efficiency at 3.11 V after 6 days of operation.

EXAMPLE 8-2

Example 8-1 was repeated, except that the line conditions were 215° C. and 71 kPa vacuum. The void content was 58.1%. One sample was tested and, at 31.3% NaOH, averaged 95.7% current efficiency at 2.98 V after 4 days of operation.

COMPARATIVE EXAMPLE A

As a control, Substrate A was passed through the laminator, sulfonyl fluoride side down with no fabric. The substrate rested on the porous release paper that is always used in the continuous line to carry material through the line and prevent sticking of material to the hot surfaces. The line was set at 225° C. and 71 kPa vacuum, and the only pattern the substrate picked up is that from the release paper. The void content of the membrane was 14%. Ten samples were tested and at 32.3% NaOH averaged 96.7% current efficiency at 3.04 V after 8-15 days of operation.

The foregoing Examples are representative of the results achieved in accordance with the invention. The average performance of over 100 examples of membranes of the invention made in our experimental work was found to be significantly better than the average in the comparative example; the average performance of over 100 membranes of the invention was 2.98 V and power consumption of 2068 KWH/MT, as compared with the average of 3.04 V and power consumption of 2110 KWH/MT for Comparative Example A. The term "significantly better" is employed here in the statistical sense; calculations showed that the difference in performance between the average results for the membranes of the invention and those of Comparative Example A is greater, at a confidence level of 99%, than can be explained by chance variation.

EXAMPLE 9

When Example 1 is repeated, with the exception that the carboxylate surface of the membrane is not coated but rather is roughened to a roughness of 1 micron by sandblasting, and a sample of the resulting membrane is used in a cell for the electrolysis of brine, substantially the same results will be obtained.

EXAMPLE 10

When Example 1 is repeated, with the exception that Substrate A is not laminated to Fabric A, but rather, indentations in the sulfonyl fluoride side of Substrate A are made by contacting it with an embossed roll having 47 lines/cm (120 lines/inch), under heat and pressure, and a sample of the resulting membrane after hydrolysis and coating as in Example 1 is used in a cell for the electrolysis of brine, substantially the same results will be obtained.

INDUSTRIAL APPLICABILITY

The ion exchange membranes of the present invention are technically advanced over membranes of the prior art. They exhibit improved performance characteristics when used as the membrane for electrolysis of NaCl solution in a chloroalkali cell, including operation at low voltage and high current efficiency, and thus at low power consumption. There is accordingly a substantial saving in operating costs resulting from the lowered consumption of power.

The membranes of this invention may also be used for the electrolysis of KCl and other inorganic compounds. For instance, the electrolysis of water is carried out to make hydrogen and oxygen. The membranes may also be used in fuel cells. Electrolysis of organic compounds is also possible.

We claim:

1. In an unreinforced fluorinated cation-exchange polymer membrane which is an unreinforced film impermeable to hydraulic flow of liquid, said membrane comprising at least first and second layers of fluorinated polymer whose functional groups are —CFZ—COOM groups or —CFQ—SO$_3$M groups, where M is H, Na, K or NH$_4$, Z is F, CF$_3$ or CF$_2$Cl, and Q is F, Cl, C$_1$ to C$_{10}$ perfluoroalkyl or CF$_2$Cl, adjacent said layers being in adherent contact with one another, said first layer being of polymer whose functional groups are -CFZ-COOM groups and said second layer being of polymer whose functional groups are —CFQ—SO$_3$M groups, the improvement wherein said membrane has a hydrogen bubble release layer at the outer surface of said first layer, has voids at the outer surface of said second layer characterized by a void content of 20 to 70%, and each said polymer with —CFZ—COOM groups has an equivalent weight of 670 to 1500 and each said polymer with —CFQ—SO$_3$M groups has an equivalent weight of 600 to 1500.

2. The membrane of claim 1 wherein said fluorinated polymer is perfluorinated polymer, each said polymer with —CFZ—COOM groups has an equivalent weight of 770 to 1250, and each said polymer with —CFQ—SO$_3$M groups has an equivalent weight of 900 to 1400.

3. The membrane of claim 2 wherein said voids are indentations in the outer surface of said second layer.

4. The membrane of claim 2 wherein said voids are channels having one dimension in the plane of said membrane which is large relative to the other two dimensions of said channels, at the outer surface of said second layer.

5. The membrane of claim 4 wherein said voids are channels resulting from removal of partially embedded sacrificial strands.

6. The membrane of claim 5 wherein said voids are channels resulting from physical removal of partially embedded sacrificial strands which are elongate metal members.

7. The membrane of claim 5 wherein said voids are channels resulting from chemical removal of partially embedded sacrificial strands which are sacrificial yarns.

8. The membrane of claim 7 wherein Z is F, Q is F, said —CF$_2$—COOM functional groups are part of —(CF$_2$)$_m$—COOM moieties where m is 1, 2 or 3, and said —CF$_2$—SO$_3$M functional groups are part of —(CF$_2$)$_p$-SO$_3$M moieties where p is 2 or 3.

9. The membrane of claim 8 wherein said void content is 25 to 40%.

10. The membrane of claim 9 wherein said channels result from removal of sacrificial yarns in the form of a woven, non-woven or knitted fabric.

11. The membrane of claim 10 wherein said —(CF$_2$)$_m$—COOM moieties are part of —O—(CF$_2$)$_m$COOM moieties, and said —(CF$_2$)$_p$—SO$_3$M moieties are part of —O—(CF$_2$)$_p$—SO$_3$M moieties 12. The membrane of claim 11 wherein said first and second layers of fluorinated polymer are the sole layers of fluorinated polymer, and said first layer is in adherent contact with said second layer.

13. The membrane of claim 1 or 12 wherein said hydrogen bubble release layer is a gas- and liquid-permeable porous non-electrode layer in adherent contact with the outer surface of said first layer.

14. The membrane of claim 2 or 12 wherein said hydrogen bubble release layer is a gas- and liquid-permeable porous non-electrode layer which comprises zirconium oxide and is in adherent contact with the outer surface of said first layer.

15. The membrane of claim 12 wherein said hydrogen bubble release layer is the outer surface of said first layer, having a roughness of 0.5 to 5 microns 16. An electrochemical cell which comprises an anode compartment, an anode situated within said anode compartment, a cathode compartment, a cathode situated within said cathode compartment, and, between said compartments, the ion exchange membrane of claim 1, said membrane being disposed such that said first layer faces toward said cathode.

17. The electrochemical cell of claim 16 wherein the spacing between said anode and said cathode is no greater than about 3 mm.

18. The electrochemical cell of claim 17 wherein said membrane is in contact with at least one of said anode and said cathode.

19. The electrochemical cell of claim 18 wherein said membrane is in contact with both said anode and said cathode.

20. In an improved process for electrolysis of brine in a chloralkali cell which cell comprises an anode, an anode compartment, a cathode, a cathode compartment, and a fluorine-containing cation exchange membrane which separates said compartments, and which process consists essentially of introducing the brine into the anode compartment of the cell and causing a current to flow through the cell to form caustic and chlorine, the improvement wich comprises employing as said membrane the ion exchange membrane of claim 1, said membrane being disposed such that said first layer faces toward the cathode.

21. The process of claim 20 wherein the spacing between said anode and said cathode is no greater than about 3 mm.

22. The process of claim 21 wherein said mem s in contact with at least one of said anode and said cathode.

23. The process of claim 22 wherein said membrane is in contact with both said anode and said cathode.

24. In an unreinforced fluorinated cation-exchange polymer membrane which is impermeable to hydraulic flow of liquid, said membrane comprising at least first and second layers of fluorinated polymer whose functional groups are —CFZ—COOM groups or —CFQ—SO$_3$M groups, where M is H, Na, K or NH$_4$, Z is F, CF$_3$ or CF$_2$Cl, and Q is F, Cl, C$_1$ to C$_{10}$ perfluoroalkyl or CF$_2$Cl, adjacent said layers being in adherent contact with one another, said first layer being of polymer whose functional groups are —CFZ—COOM groups and said second layer being of polymer whose functional groups are —CFQ—SO$_3$M groups, the improvement wherein said membrane has, as the sole support elements, sacrificial elements partially embedded in the outer surface of said second layer such that after removal of said sacrificial elements, there are voids at the outer surface of said second layer characterized by a void content of 20 to 70%, and each said polymer with —CFZ—COOM groups has an equivalent weight of 670 to 1500 and each said polymer with —CFQ—SO$_3$M groups has an equivalent weight of 600 to 1500.

25. The membrane of claim 24 wherein said fluorinated polymer is perfluorinated polymer, each said polymer with —CFZ—COOM groups has an equivalent weight of 770 to 1250, and each said polymer with —CFQ—SO$_3$M groups has an equivalent weight of 900 to 1400.

26. The membrane of claim 25 wherein said sacrificial elements are polyester, polyamide, acrylic or cellulosic sacrificial yarns.

27. The membrane of claim 26 wherein Z is F, Q is F, said —CF$_2$—COOM functional groups are part of —(CF$_2$)$_m$—COOM moieties where m is 1, 2 or 3, and said —CF$_2$—SO$_3$M functional groups are part of —(CF$_2$)$_p$—SO$_3$M moieties where p is 2 or 3.

28. The membrane of claim 27 wherein, after removal of said sacrificial yarns, said void content is 25 to 40%.

29. The membrane of claim 28 wherein said sacrificial yarns are in the form of a woven, non-woven or knitted fabric.

30. The membrane of claim 21 wherein said —(CF$_2$)$_m$—COOM moieties are part of —O—(CF$_2$)$_m$COOM moieties, and said —(CF$_2$)$_p$—SO$_3$M moieties are part of —O—(CF$_2$)$_p$—SO$_3$M moieties.

31. The membrane of claim 30 wherein said first and second layers of fluorinated polymer are the sole layers of fluorinated polymer, and said first layer is in adherent contact with said second layer.

32. The membrane of claim 25 or 31 wherein said membrane has a hydrogen bubble release layer which is a gas- and liquid-permeable porous non-electrode layer in adherent contact with the outer surface of said first layer.

33. The membrane of claim 24 or 31 wherein said membrane has a hydrogen bubble release layer at the outer surface of said first layer.

34. The membrane of claim 33 wherein said hydrogen bubble release layer is a gas- and liquid-permeable porous non-electrode layer which comprises zirconium oxide and is in adherent contact with the outer surface of said first layer.

35. The membrane of claim 33 wherein said hydrogen bubble release layer is the outer surface of said first layer, having a roughness of 0.5 to 5 microns.

36. In an unreinforced fluorinated polymer membrane which is impermeable to hydraulic flow of liquid, said membrane comprising at least first and second layers of fluorinated polymer whose functional groups are —CFZ—COOR groups or —CFQ—SO$_2$X groups, where R is lower alkyl, X is F or Cl, Z is F, CF$_3$ or CF$_2$Cl, and Q is F, Cl, C$_1$ to C$_{10}$ perfluoroalkyl or CF$_2$Cl, adjacent said layers being in adherent contact with one another, said first layer being of polymer whose functional groups are —CFZ—COOR groups and said second layer being of polymer whose functional groups are —CFQ—SO$_2$X groups, the improvement wherein said membrane has, as the sole support elements, sacrificial elements partially embedded in the outer surface of said second layer such that after removal of said sacrificial elements, there are voids at the outer surface of said second layer charcterized by a void content of 20 to 70%, and each said polymer with —CFZ—COOR groups has an equivalent weight of 670 to 1500 and each said polymer with —CFQ—SO$_2$X groups has an equivalent weight of 600 to 1500.

37. The membrane of claim 36 wherein said fluorinated polymer is perfluorinated polymer, each said polymer with —CFZ—COOR groups has an equivalent weight of 770 to 1250, and each said polymer with —CFQ—SO$_2$X groups has an equivalent weight of 900 to 1400.

38. The membrane of claim 37 wherein said sacrificial elements are polyester, polyamide, acrylic, or cellulosic sacrificial yarns.

39. The membrane of claim 38 wherein Z is F, Q is F, said —CF$_2$—COOR functional groups are part of —(CF$_2$)$_m$—COOR moieties where m is 1, 2 or 3, and said —CF$_2$—SO$_2$X functional groups are part of —(CF$_2$)$_p$—SO$_2$X moieties where p is 2 or 3, and after removal of said sacrificial yarns, said void content is 25 to 40%.

40. The membrane of claim 39 wherein said —(CF$_2$)$_m$—COOR moieties are part of —O—(CF$_2$)$_m$COOR moieties, and said —(CF$_2$)$_p$—SO$_2$X moieties are part of —O—(CF$_2$)$_p$—SO$_2$X moieties, said first and second layers of fluorinated polymer are the sole layers of fluorinated polymer, and said first layer is in adherent contact with said second layer.

41. The membrane of claim 36 or 40 wherein said membrane has a hydrogen bubble release layer at the outer surface of said first layer.

42. The membrane of claim 41 wherein said sacrificial yarns are in the form of a woven, non-woven or knitted fabric.

43. In an unreinforced fluorinated polymer membrane which is an unreinforced film impermeable to hydraulic flow of liquid, said membrane comprising at least first and second layers of fluorinated polymer whose functional groups are —CFZ—COOR groups or —CFQ—SO$_2$X groups, where R is lower alkyl, X is F or Cl, and Z is F, CF$_3$ OR CF$_2$Cl, and Q is F, Cl, C$_1$ to C$_{10}$ perfluoroalkyl or CF$_2$Cl, adjacent said layers being in adherent contact with one another, said first layer being of polymer whose functional groups are —CFZ—COOR groups and said second layer being of polymer whose functional groups are —CFQ—SO$_2$X groups, the improvement wherein said membrane has voids at the outer surface of said second layer characterized by a void content of 20 to 70%, and each said polymer with —CFZ—COOR groups has an equivalent weight of 670 to 1500 and each said polymer with —CFQ—SO$_2$X groups has an equivalent weight of 600 to 1500.

44. The membrane of claim 43 wherein said fluorinated polymer is perfluorinated polymer, each said polymer with —CFZ—COOR groups has an equivalent weight of 770 to 1250, and each said polymer with —CFQ—SO$_2$X groups has an equivalent weight of 900 to 1400.

45. The membrane of claim 44 wherein said voids are channels having one dimension in the plane of said membrane which is large relative to the other two dimensions of said channels, at the outer surface of said second layer.

46. The membrane of claim 45 wherein said voids a channels resulting from removal of partially embedded sacrificial strands.

47. The membrane of claim 46 wherein said voids are channels resulting from chemical removal of partially embedded sacrificial strands which are sacrificial yarns.

48. The membrane of claim 40 wherein Z is F, Q is F, said —CF$_2$—COOR functional groups are part of —(CF$_2$)$_m$—COOR moieties where m is 1, 2 or 3, and said —CF$_2$—SO$_2$X functional groups are part of —(CF$_2$)$_p$SO$_2$X moieties where p is 2 or 3, and said voids are characterized by a void content of 25 to 40%.

49. The membrane of claim 48 wherein said —(CF$_2$)$_m$—COOR moieties are part of —O—(CF$_2$)$_m$COOR moieties, and said —(CF$_2$)$_p$—SO$_2$X moieties are part of —O—(CF$_2$)$_p$—SO$_2$X moieties, said first and second layers of fluorinated polymer are the sole layers of fluorinated polymer, and said first layer is in adherent contact with said second layer.

50. The membrane of claim 43 or 49 wherein said membrane has a hydrogen bubble release layer at the outer surface, of said first layer.

51. The membrane of claim 50 wherein said channels result from removal of sacrificial yarns in the form of a woven, non-woven or knitted fabric.

* * * * *